United States Patent
Seater et al.

(10) Patent No.: US 12,254,304 B2
(45) Date of Patent: Mar. 18, 2025

(54) FIRMWARE UPDATE TECHNIQUES

(71) Applicant: Intel Corporation, Santa Clara, CA (US)

(72) Inventors: Larry R. Seater, Portland, OR (US); Benjamin Cheong, Tigard, OR (US); Manishkumar T. Rana, Hillsboro, OR (US); Stephen A. Fife, Hillsboro, OR (US); James R. Hearn, Hillsboro, OR (US); Kevin Liedtke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 16/857,103

(22) Filed: Apr. 23, 2020

(65) Prior Publication Data

US 2020/0257517 A1    Aug. 13, 2020

(51) Int. Cl.
| | | |
|---|---|---|
| G06F 11/07 | (2006.01) | |
| G06F 1/28 | (2006.01) | |
| G06F 1/3234 | (2019.01) | |
| G06F 8/65 | (2018.01) | |
| G06F 9/445 | (2018.01) | |
| G06F 13/24 | (2006.01) | |
| G06F 13/42 | (2006.01) | |

(52) U.S. Cl.
CPC . G06F 8/65 (2013.01); G06F 1/28 (2013.01)

(58) Field of Classification Search
CPC .......... G06F 11/004; G06F 1/24; G06F 1/206; G06F 11/1435; G06F 8/65; G06F 1/28; G06F 1/3212; G06F 9/4401; G06F 1/3287; G06F 8/654; G06F 9/4411; G06F 8/656; G06F 1/3234; G06F 21/572; G06F 1/3218; G06F 1/3284; G06F 1/3215; G06F 1/325; G06F 1/3265; G06F 1/3203; G06F 9/4406; G06F 13/1668; G06F 13/4221; H02J 7/0042; H02J 7/007; H02J 7/00034; G09G 1/005; G09G 1/165; G09G 5/006; G09G 1/167; G03G 15/5075; G06K 15/12; H04L 41/0806; H04L 41/0859; H04L 41/0863
See application file for complete search history.

(56) References Cited

U.S. PATENT DOCUMENTS

| | | | |
|---|---|---|---|
| 9,152,205 B2 * | 10/2015 | Falik | G06F 1/3206 |
| 10,387,257 B1 * | 8/2019 | Brown | H04L 67/34 |
| 11,314,578 B2 * | 4/2022 | Chaiken | G06F 11/0745 |
| 2006/0015861 A1 * | 1/2006 | Takata | G06F 8/656 |
| | | | 717/162 |
| 2016/0231804 A1 * | 8/2016 | Bulusu | G06F 1/3234 |
| 2018/0004504 A1 | 1/2018 | Stenfort et al. | |

* cited by examiner

Primary Examiner — Thuy Dao
(74) Attorney, Agent, or Firm — Compass IP Law PC

(57) ABSTRACT

Examples described herein relate to a circuit board that includes a device, firmware memory, and a power controller. In some examples, the firmware memory is to store a firmware update and in response to a software-initiated command, the power controller is to reduce power to the device to cause a firmware update of the device and restore power to the device to cause execution of the firmware update. In some examples, the power controller is to reduce power solely to the device independent from power supply to at least one other device. In some examples, device configuration is saved prior to reduction of power to the device and restored to the device after power is restored to the device.

24 Claims, 8 Drawing Sheets

FIRMWARE UPDATE TECHNIQUES

Computing devices typically include firmware responsible for hardware initialization, low-level hardware management, and managing the boot process. In addition to the platform firmware, computing devices may also include dedicated firmware for controller chips, peripheral devices, or other components. Firmware is typically read at runtime and in connection with a boot, but may be updated in connection with a specialized firmware update process.

DETAILED DESCRIPTION

A firmware update to a device can lead to a server being unavailable for large amounts of time as multiple devices are to be restarted, including device without a particular firmware update. For example, in some scenarios, a server can be unavailable for 30 minutes in connection with firmware updates. Various embodiments provide a software management console to control firmware updates to specific devices and control specifically which devices experience a power reset instead of all devices, including devices that are not subject to a firmware update. Various embodiments provide a power cycling circuit (PCC) that controls a power output to a device in connection with a firmware update. Various embodiments can reduce or eliminate the need to reboot the system for a firmware update to a device, thereby significantly reducing the amount of money lost due to server unavailability from scheduling and performing server reboots.

Various embodiments allow software to save configuration space data of a device, trigger removal of power to the device after a firmware update, restore power to the device, reload configuration space data, and resume normal operation of the device without power cycling the entire system.

Figure 1:
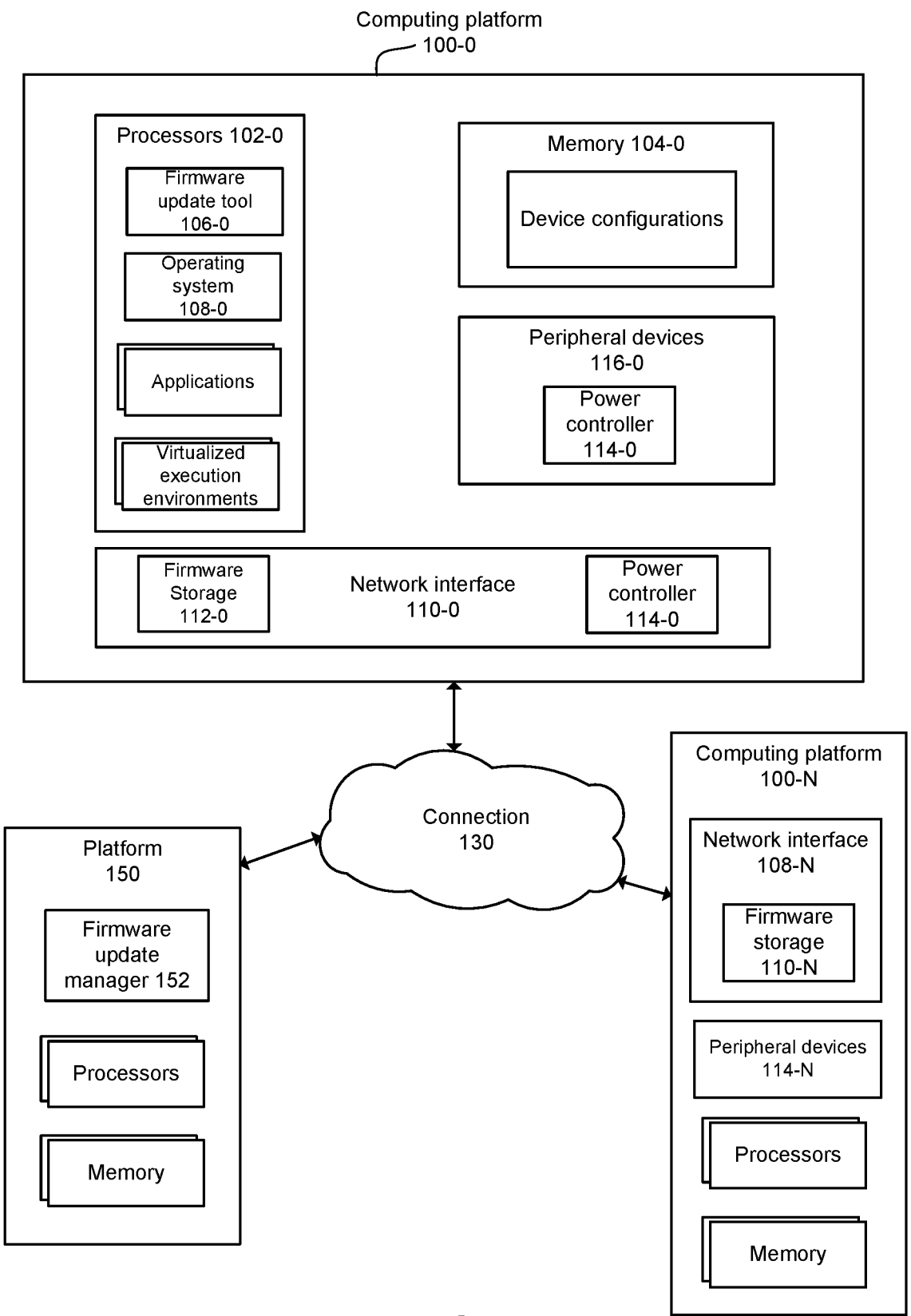
FIG. 1 depicts an example system.

FIG. 1 depicts an example system. The system can be used to update a firmware of one or more devices without causing a power reset to a device that is not undergoing a firmware update. Computing platforms 100-0 to 100-N (where N≥1) can interact with platform 150 in connection with firmware updates. Computing platform 100 can refer to any or all of computing platforms 100-0 to 100-N and any component of computing platform 100-0 can refer to a similar component in any or all of computing platforms 100-0 to 100-N. In some examples, processors 102 can include one or more of: a central processing unit (CPU), graphics processing unit (GPU), field programmable gate array (FPGA), or application specific integrated circuit (ASIC). In some examples, a CPU can be sold or designed by Intel®, ARM®, AMD®, Qualcomm®, IBM®, Texas Instruments®, among others. Processors 102-0 can execute OS 108-0. In some examples, OS 108-0 can be Linux®, Windows®, FreeBSD®, Android®, MacOS®, iOS®, or any other operating system. Memory 104-0 can be any type of volatile or non-volatile memory. Computing platform 100 can use processors 102-0 and memory 104-0 to execute operating system 108-0, applications, or virtualized execution environments (VEEs). A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Platform 100-0 can use network interface 110-0 to transmit or receive content using connection 130. An administrator can use firmware update manager 152 executed on platform 150 to select devices among computing platforms 100-0 to 100-N to receive a firmware update and which firmware update to receive. In some examples, the administrator can access a graphical user interface to select one or more devices to receive a firmware update. Upon indication of successful firmware update, an administrator can use deploy driver updates depending on the operating system. In accordance with various embodiments, platform 150 can issue a firmware or other software update to any computing platform 100 via operating system 108 to update at least firmware in network interface 110 or another device that is to undergo a firmware update without causing a disruption in operation or power reset to a device that is not to undergo a firmware update. For example, platform 150 can initiate a firmware or other software update on network interface 110-0 by sending a firmware update to network interface 110-0. Computing platform 100-0 is alerted that an update is to occur. In some examples, computing platform 100-0 downloads and installs the firmware update image or receives the firmware update via packets sent by platform 150.

Processors 102-0 can execute firmware update tool 106-0 to identify when an attempt to update firmware is initiated by platform 150 and to validate and permit an attempt to update firmware of network interface 110-0 or another peripheral device 116-0 (e.g., accelerator, video or display card, memory controller, storage controller, or any peripheral device connected through an interface (e.g., PCIe)) or deny the attempt. For a permitted firmware update, firmware update tool 106-0 can perform one or more of: (a) save configuration information of the device that is to be updated (e.g., PCIe configuration space information such as allocated physical functions (PFs)) into memory 104-0, (b) notify a power controller 114-0 of the device (e.g., power controller 114-0) to reduce power to zero to the device and increase the power to the device to operating power level of the device, and (c) store configuration information into the device that has been power cycled (e.g., power reduced and increased to operating power level). Thereafter the device can operate using updated firmware and without causing other devices to power cycle and disrupting operation of other devices that are not subject to firmware update. In connection with firmware updates, operating system (OS) 108-0 can perform disable a driver for the device during or in connection with the firmware update and enable the driver for use after the device has its firmware updated.

Connection 130 can be provide communications compatible or compliant with one or more of: Ethernet (IEEE 802.3), remote direct memory access (RDMA), InfiniB and, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 2:
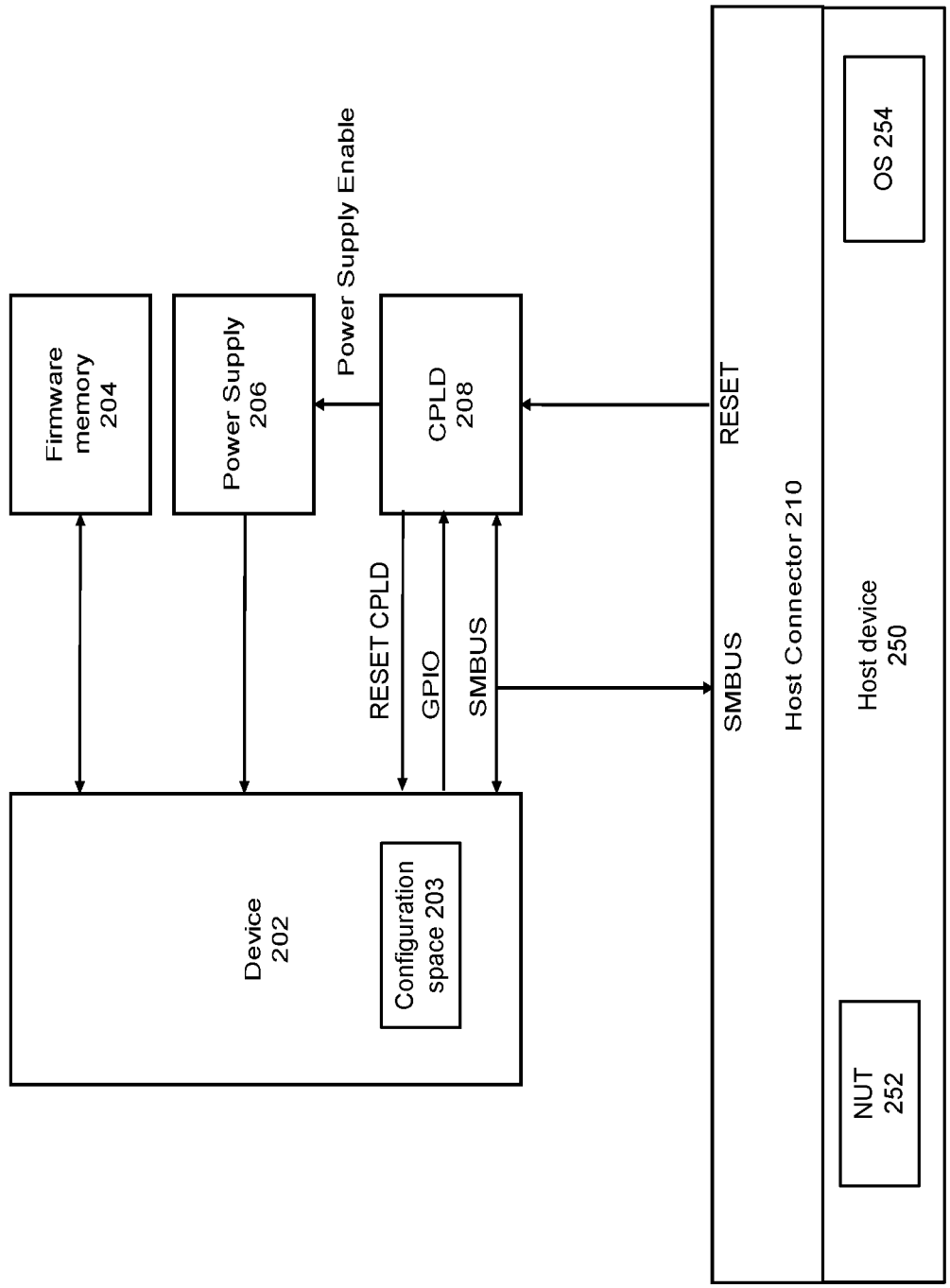
FIG. 2 depicts an example system.

FIG. 2 depicts a block diagram of a system. In accordance with various embodiments, CPLD 208 can control power reset to merely device 202 that is subject to a seamless firmware update or upgrade without causing power disruption to another device that is not subject to a firmware update when merely device 202 receives a firmware update. For example, if device 202 is or includes a network interface, during a firmware update of the network interface, migration of a virtual execution environment that uses the network interface may not be performed. For example, a firmware memory update can trigger a stop mechanisms used during virtual machine live migration to ensure virtual machines are notified a PF is disabled. Virtual machines may drop packets that are to be transmitted or can continue provide to packets that are queued for transmission.

Non-volatile memory (NVM) update tool (NUT) 252 can update contents of firmware memory 204 by adding another firmware to firmware memory 204. NUT 252 can determine if the firmware update (e.g., seamless update or seamless upgrade) involves a device power cycle or reboot for device 202. For example, a power cycle can be applied to device 202 such as in cases where changes are internal to functionality of device 202. If a reboot is to be applied, an administrator can be instructed to reboot host device 250 as well as device 202 and potentially other peripheral devices. For example, a device reboot can be used for port configuration changes (e.g., 2×100 Gbps, 4×50 Gpbs, or 8×25 Gbps). For example, a device reboot can be used to update a different number of physical functions (PFs) and the OS can restart device 202 in order to allocate resources properly to the new set of PFs. For example, PFs are described in single-root I/O virtualization (SR-IOV) and reboot can be performed so that the OS can re-allocate a number of available PFs. In some examples, the OS could re-allocate a number of available PFs without a reboot.

SR-IOV is a specification that describes use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCI configuration space but can share one or more physical resources on the network adapter, such as an external network port, with the PF and other PFs or other VFs.

While examples are provided for network interfaces and updating firmware, various embodiments can be applied to any hardware that requires power cycling or could also be used to enable a user to intelligently turn off/on hardware to save device power.

Device 202 can be an Ethernet controller, network interface, storage controller, memory controller, display engine, graphics processing unit (GPU), accelerator device, or any peripheral device. Firmware memory 204 can store one or multiple firmware versions that can be executed by device 202. Firmware can be instructions (e.g., binary code) that controls how a device operates. Firmware can be instructions (e.g., binary code) that controls how a device operates. For example, for a network interface firmware can add or update protocol support, update physical function (PF) lists, update netlists, update Ethernet message passing (EMP) firmware (e.g., exposes and interface for software to communicate with a link management agent), update link establishment state machine (LESM), assist link management agent obtain link, Netlist (e.g., customize the configuration of the network interface ports), configure admin queue, configure network interface defaults, configure remote direct memory access (RDMA) firmware, configure preboot binary executable, configure custom analog settings, configure physical layer (PHY) firmware, and so forth. In some embodiments, firmware can include one or more of: Basic Input/Output System (BIOS), Universal Extensible Firmware Interface (UEFI), a boot loader, Converged Security and Management Engine (CSME) firmware, platform security processor firmware, and BMC firmware among others. The BIOS firmware can be pre-installed on a personal computer's system board or accessible through an SPI interface from a boot storage (e.g., flash memory). In some examples, a BIOS can be stored on a device and accessible from the device by one or more cores or CPUs using an interface such as Serial Peripheral Interface (SPI) or other interface (e.g., PCIe). BIOS can initialize and test the system hardware components and loads a boot loader from a memory device which initializes and executes an operating system. Various non-limiting examples of firmware are provided herein.

In some examples, a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

OS 254, in some examples, can be Linux®, Windows®, FreeBSD®, Android®, MacOS®, iOS®, or any other operating system. The OS and driver can execute on a CPU sold or designed by Intel®, ARM®, AMD®, Qualcomm®, IBM®, Texas Instruments®, among others.

Power supply 206 can provide voltage and/or current to device 202. For example, power supply 206 can include one or multiple power supply devices and provide an operating voltage as an on-chip linear regulator or an off-chip source. A topology for power supply 206 can be consistent with a printed circuit board (PCB) board, M.2 board, field programmable gate array (FPGA)-based boards, or other circuit boards.

Complex Programmable Logic Device (CPLD) 208 can control an extent to which power supply 206 provides power to device 202. In accordance with various embodiments, CPLD 208 can turn on or off power merely to device 202 to cause loading of a firmware update for device 202 but not cause a power disruption or reset of any other device that is not having a firmware update or change. CPLD 208 can include a programmable pin array. CPLD 208 can monitor voltage, current or power supplied to device 202 to determine if a power reset (e.g., reduction of power, voltage or current below one or multiple thresholds) has occurred for device 202 or determine if increase in power, voltage or current to or above one or multiple thresholds has occurred for device 202. For example, CPLD 208 can apply a timer to determine if sufficient elapsed time has accrued after a power has been stopped or reduced to zero by power supply 206 to approximately determine if a power cycle has occurred for device 202.

In some examples, CPLD 208 causes a power cycle to device 202 to cause device 202 to load firmware from firmware memory 204. During a power loss to device 202, device 202 can lose firmware configuration in a volatile memory and device 202 can determine if a firmware is available from firmware memory 204. For example, firmware can be available for loading if a local area network (LAN) power available indicator or another indicator indicates to retrieve firmware from memory 204. In some embodiments, CPLD 208 indicates to device 202 to load firmware from firmware memory 204. CPLD 208 can assert RESET CPLD (e.g., PERST CPLD) to device 202 to cause device 202 to load firmware from firmware memory 204 and cause device 202 to re-connect to connector 210. In some examples, CPLD 208 can be implemented as a Field-Effect Transistors (FETs) or voltage monitor connected to power supply 206.

In some examples, device 202 that is subject to a firmware update can either remain active on connector 210 using particular logic that responds to no-op or idle commands even when the device is powered-down for the firmware update. In some examples, device 202 can disconnect from connector 210 during the power-down for the firmware update. In some examples, even if host device 250 does not support hotadd/remove of devices, device 202 can restore connection with connector 210 such that host device 250 or its OS would not know that the firmware update occurred.

Host connector 210 can be an interface for at least device 202 and CPLD 208 to host device 250. For example, device 202 can be connected as a PCIe device with host device 250. Host connector 210 can be a PCIe compatible connector, SMBus, or other interface.

If device power cycle is to be applied to device 202 to cause a firmware update, then one or more of the following actions can occur. At (1), NUT 252 identifies parameters of device 202 (e.g., base address register (BAR) and configuration space 203 (e.g., PF configurations)) of device 202 and saves it into memory of host device 250. At (2) NUT 252 notifies CPLD 208 of a firmware update operation via a sideband signal (e.g., SMBUS). At (3), CPLD 208 asserts reset signal (e.g., RESET CPLD) to device 202, and then causes power supply 206 to provide zero power to device 202. At (4), after detecting power has reached zero, CPLD 208 enables power supply 206 to provide power to device 202. At (5), power supply 206 responds to enablement and provides power to device 202. At (6), after detecting power-up of device 202 (e.g., operating level power) being provided to device 202 after the power-down, CPLD 208 de-asserts reset signal (e.g., RESET CPLD) to device 202, and indicates to NUT 252 that device 202 has reset. However, if any of (3)-(5) fail, CPLD 208 returns an error to NUT 252 and an administrator can be informed to restart the system. At (7), NUT 252 restores the saved configuration to device 202 to configuration space 203. Thereafter, device 202 can use the updated firmware.

In some examples, device 202 can be part of a local area network (LAN) on motherboard (LOM) designs where devices are connected as a LAN using connections embedded in a motherboard of a server or computing instead of using a separate network interface card (e.g., Ethernet). Device 202 can be power controlled when a firmware update is to occur for device 202. In some examples, device 202 can be part of a system on a chip (SoC) and power controlled when a firmware update is to occur.

Figure 3:
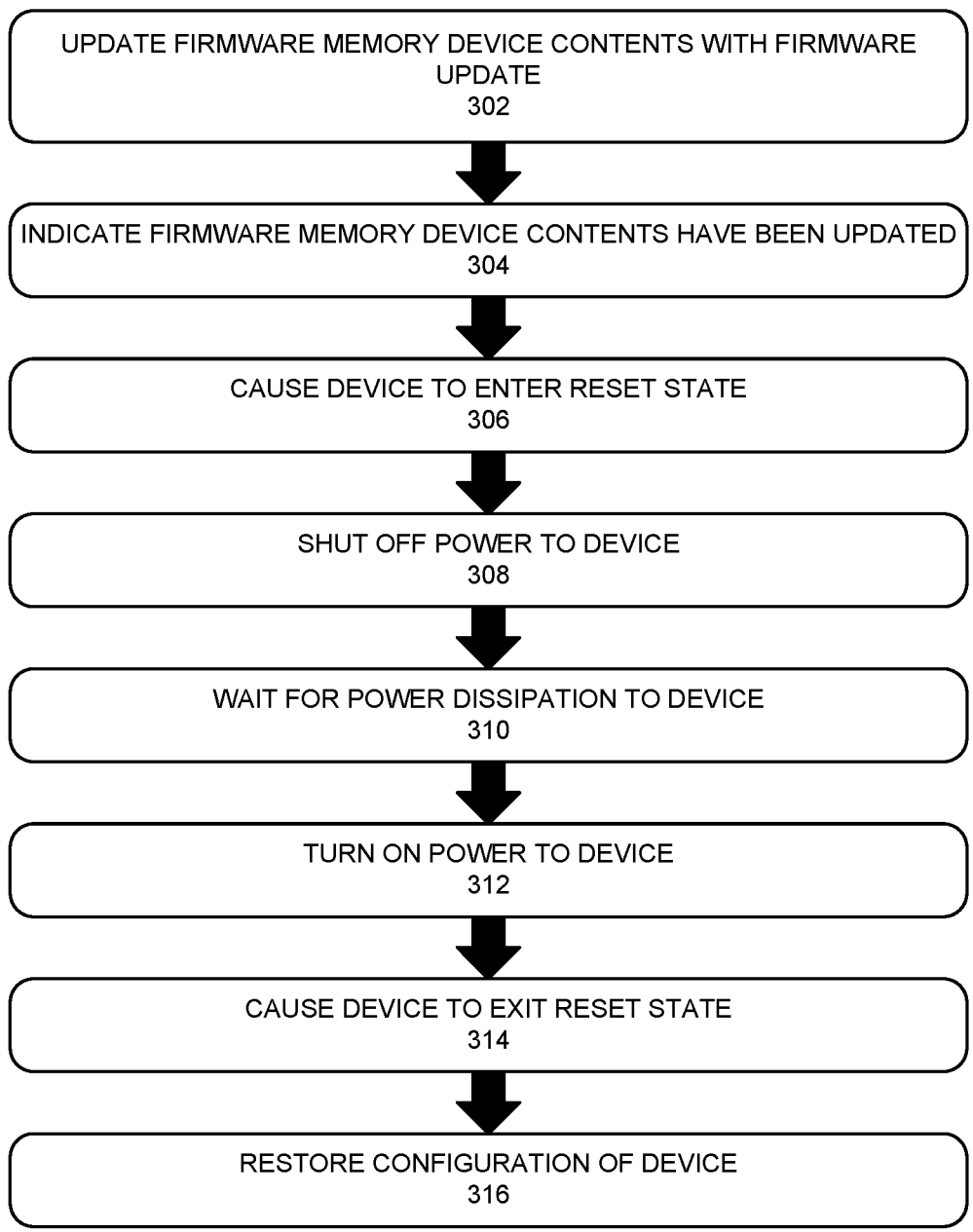
FIG. 3 depicts an example process.

FIG. 3 depicts an example process. The process can be used to cause a power cycle or reset to merely a device that is to undergo a firmware update. At 302, flash memory device contents are updated with a firmware update. For example, an NVM update tool can be used to store a firmware update into flash memory using a PCIe interface and/or SMBus interface. At 304, flash memory device contents are indicated to be updated with a firmware update. For example, an NVM update tool can indicate flash memory is updated by toggling a GPIO pin or communicating using SMBus to change a value on a CPLD pin. At 306, a power controller can cause a device to enter reset state. For example, a CPLD can assert a reset signal (e.g., RESET) to cause the device to enter reset state. At 308, power can be shut-off to the device. For example, the CPLD can de-assert power supply enable pin to cause the power supply to stop supplying power to the device. At 310, an amount of time to achieve power dissipation to the device can elapse. For example, the CPLD can begin a timer and wait pre-determined amount of time for power to the device to fully dissipate. At 312, the operating power to the device can be restored. For example, after the timer expires, the CPLD can toggle the power supply enable pin to turn on power supply to the device. At 314, the device can exit reset state. For example, CPLD can wait a pre-determined amount of time and then de-assert a reset signal (e.g., RESET) to the device to cause the device to exit reset mode. The device can execute the updated firmware. At 316, configuration of the device can be restored. For example, the NUT can restore configuration space content for the device (e.g., PCIe configuration space content).

Figure 4:
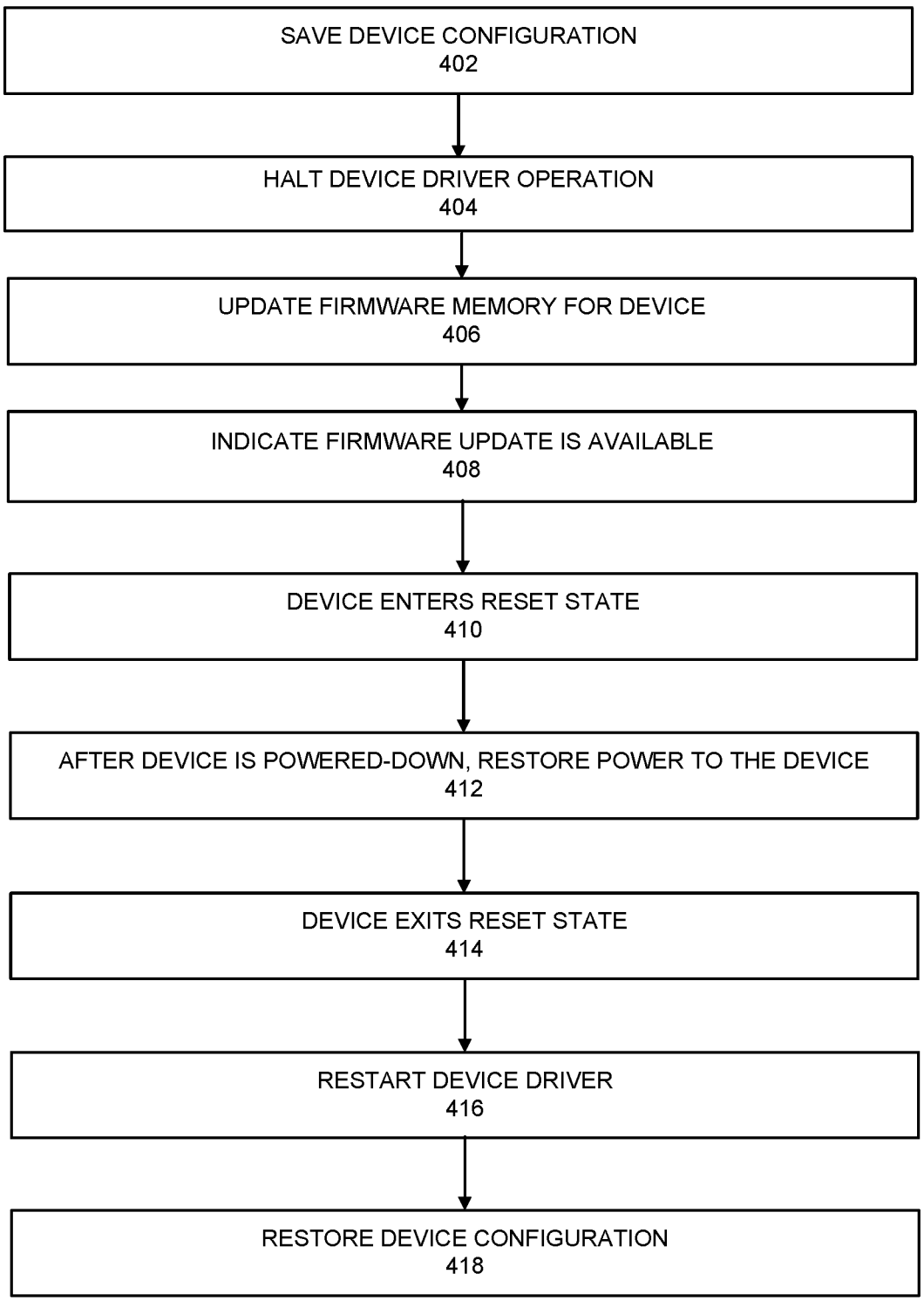
FIG. 4 depicts an example process.

FIG. 4 depicts an example process. The process can be used to cause a power cycle or reset to merely a device that is to undergo a firmware update. At 402, device configuration can be saved. For example, a NUT or firmware update tool can save PCIe configuration space of the device. At 404, device driver operation can be halted. At 406, an update of firmware memory for the device can occur. For example, in some examples, the firmware update can be a newer version or an older version than the firmware the device is currently executing. The update firmware can be stored in a memory bank that is different than the memory bank which stores currently executed firmware. The memory bank can be volatile or non-volatile memory. A memory bank can represent a region in memory. A PCIe interface, SPI interface, SMBus, or other interface can be used to transport the firmware update from the host system to the firmware memory.

At 408, an indication of available firmware update is provided. For example, the indication of update can be provided by a firmware update tool executing on a host system that is capable of updating the device. The indication of update can be made by toggling a general-purpose input/output (GPIO) pin or via an SMBus. At 410, the device can enter a reset state. For example, a CPLD can assert RESET CPLD (e.g., PERST CPLD) to cause a power control circuit to cause a power-down of the device. At 412, after device is powered-down, power is restored to the device. For example, the CPLD can wait for a time amount for power discharge or monitor voltage to the device to determine if power to the device reaches zero. To restore power to the device, the CPLD can turn on power supply to the device.

At 414, device exits reset state. For example, the CPLD can de-assert RESET CPLD. After reset state is exited, the device executes the new firmware. At 416, device driver can be restarted. For example, restarting the device driver can permit software interaction with the device. At 418, firmware update tool restores configuration of device to state prior to power-down.

Figure 5:
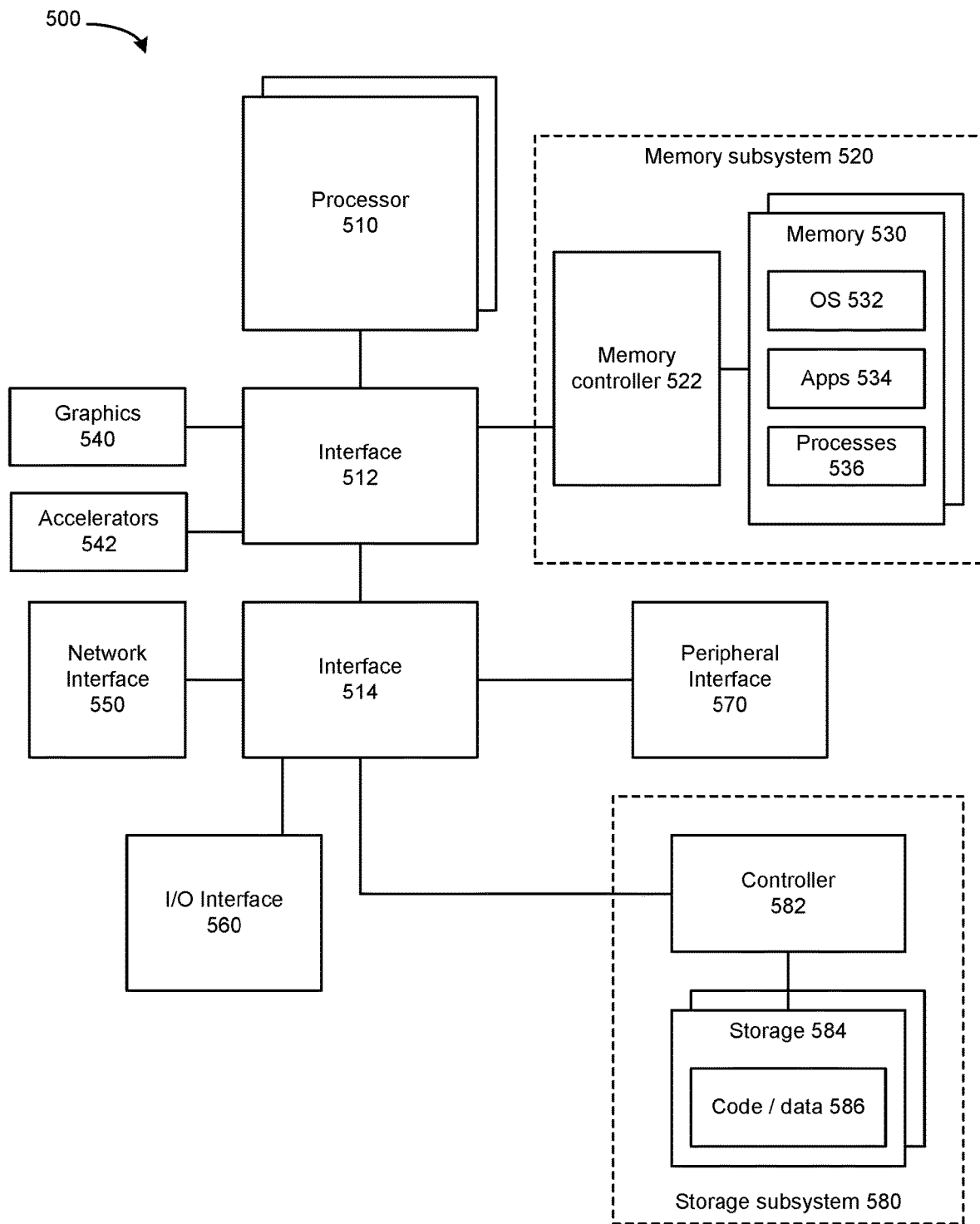
FIG. 5 depicts an example system.

FIG. 5 depicts an example system. The system can use embodiments described herein to perform software-controlled power reset or cycling for a device that is to apply updated firmware. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that uses higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be fixed function and/or programmable offload engines that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It can be understood that memory controller 522 could be a physical part of processor 510 or a physical part of interface 512. For example, memory controller 522 can be an integrated memory controller, integrated onto a circuit with processor 510.

While not specifically illustrated, it can be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 6:
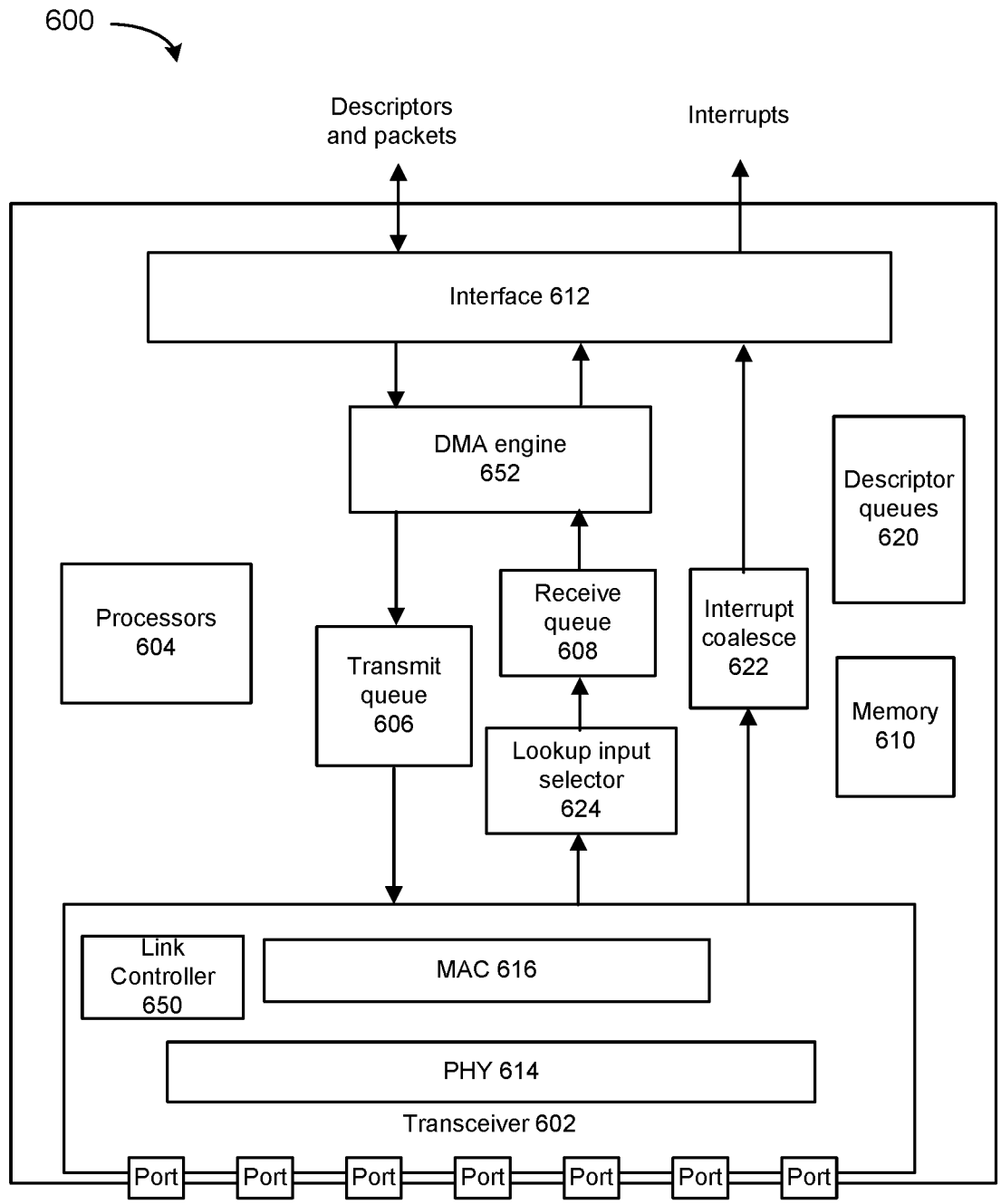
FIG. 6 depicts a network interface.

FIG. 6 depicts a network interface. Embodiments described herein can be used to provide a software controlled power cycle to update firmware of the network interface. Transceiver 602 can be capable of receiving and transmitting packets in conformance with the applicable protocols such as Ethernet as described in IEEE 802.3, although other protocols may be used. Transceiver 602 can receive and transmit packets from and to a network via a network medium (not depicted). Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to assemble data to be transmitted into packets, that include destination and source addresses along with network control information and error detection hash values.

In accordance with some embodiments, link controller 650 controls auto negotiation and link establishment with one or more link partners to determine link speed, FEC modes and pause capabilities. Link partners can be host devices, modules (e.g., optical communication modules), or other communications chips. In some examples, link controller 650 can be firmware implemented into MAC circuitry 616 or available for use by MAC circuitry 616.

Processors 604 can be any a combination of a: processor, core, graphics processing unit (GPU), field programmable gate array (FPGA), application specific integrated circuit (ASIC), or other programmable hardware device that allow programming of network interface 600. For example, processors 604 can provide for identification of a resource to use to perform a workload and generation of a bitstream for execution on the selected resource. For example, a "smart network interface" can provide packet processing capabilities in the network interface using processors 604.

Packet allocator 624 can provide distribution of received packets for processing by multiple CPUs or cores using timeslot allocation described herein or RSS. When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Interface 612 can provide an interface with host device (not depicted). For example, interface 612 can be compatible with PCI, PCI Express, PCI-x, Serial ATA, and/or USB compatible interface (although other interconnection standards may be used).

Figure 7:
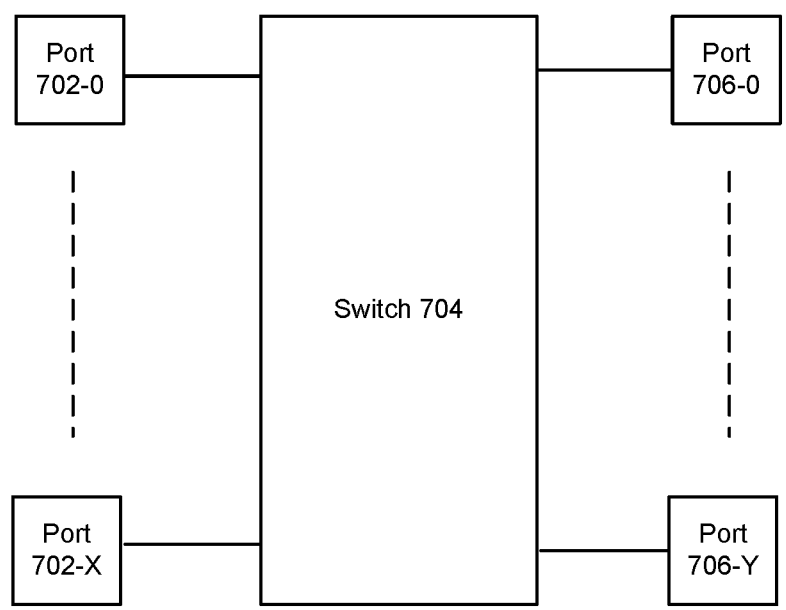
FIG. 7 depicts a switch.

FIG. 7 depicts a switch. Embodiments described herein can be used to provide a software controlled power cycle to update firmware of the switch. Switch 704 can route packets or frames of any format or in accordance with any specification from any port 702-0 to 702-X to any of ports 706-0 to 706-Y (or vice versa). Any of ports 702-0 to 702-X can be connected to a network of one or more interconnected devices. Similarly, any of ports 706-0 to 706-X can be connected to a network of one or more interconnected devices. Switch 704 can decide which port to transfer packets or frames to using match-action units or a table that maps packet characteristics with an associated output port. In addition, switch 704 can perform packet replication for forwarding of a packet or frame to multiple ports and queuing of packets or frames prior to transfer to an output port.

Figure 8:
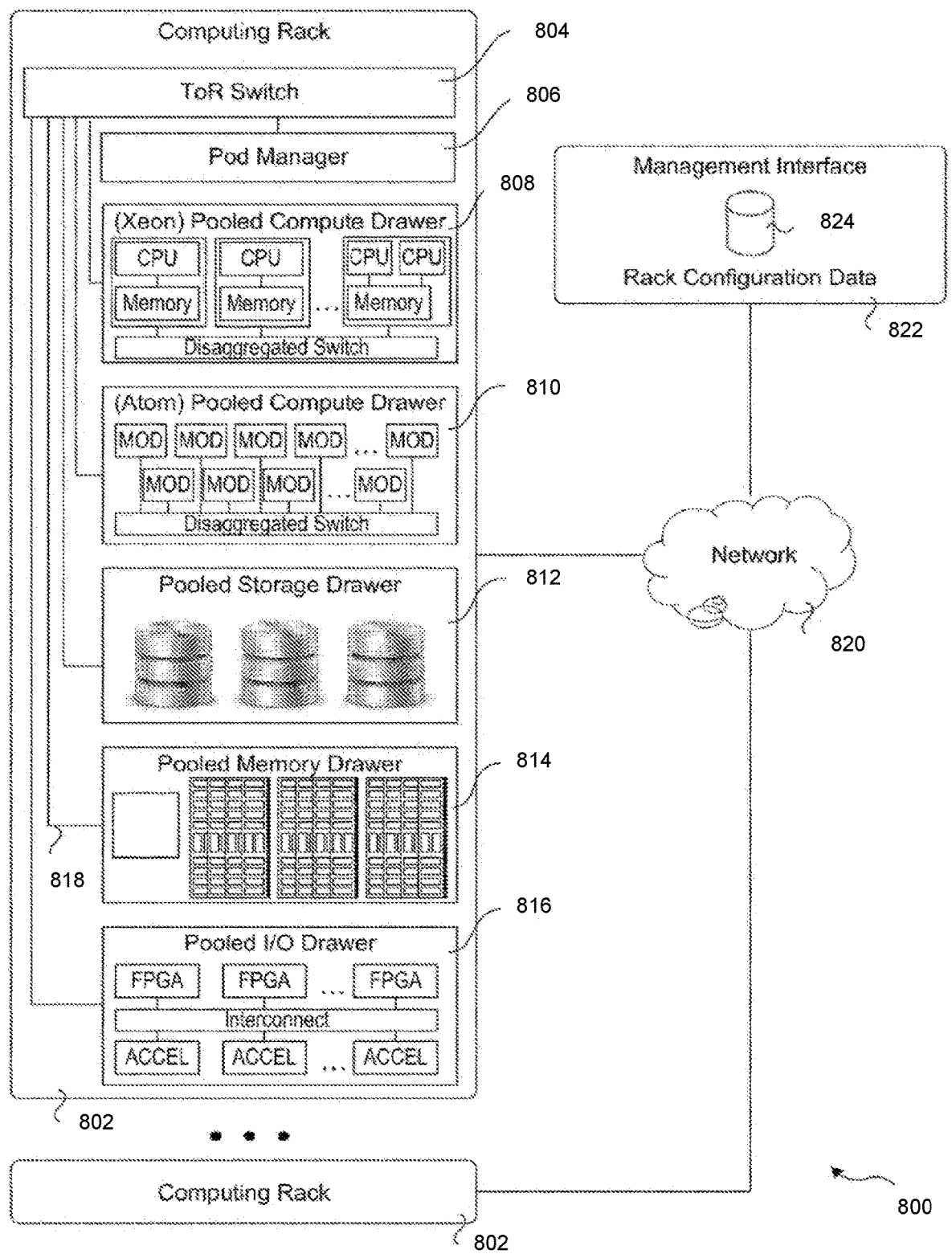
FIG. 8 depicts an environment.

FIG. 8 depicts an environment 800 includes multiple computing racks 802, each including a Top of Rack (ToR) switch 804, a pod manager 806, and a plurality of pooled system drawers. Various embodiments can be used to control which device is subject to a power cycle in connection with a firmware update. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

What is claimed is:

1. A computer-implemented method comprising:
causing a power cycle solely to a device that is subject to a firmware update while allowing power supply to at least one other device, wherein the power cycle comprises reducing power to the device to a first level to turn off the device and wherein the causing the power cycle causes saving Peripheral Component Interconnect (PCIe) configuration space information and
restoring power to the device to a second level, to turn on the device, after the device is turned off, wherein the first level is less than the second level, wherein the restoring power to the device causes the device to load a firmware update, and wherein the restoring power to the device to the second level after the device is turned off causes restoring the PCIe configuration space information to the device.

2. The method of claim 1, comprising:
saving device configuration before performing a power cycle on the device.

3. The method of claim 1, comprising:
storing the firmware update for access by the device.

4. The method of claim 1, comprising:
loading a saved device configuration into the device and resuming operation of the device using the firmware update.

5. The method of claim 1, wherein the device comprises one or more of: a network interface, accelerator, central processing unit (CPU), accelerator, video card, memory controller, storage controller, or peripheral device.

6. The method of claim 5, wherein the device is part of a system on a chip (SoC).

7. The method of claim 1, comprising: not rebooting a server coupled to the device in connection with a firmware update of the device.

8. The method of claim 1, wherein the device disconnects from an interface with a host system in connection with the firmware update.

9. The method of claim 1, wherein the device retains connection with an interface to a host system in connection with the firmware update.

10. The method of claim 1, wherein the device is coupled to a circuit board and comprising:
the device loading the firmware update from non-volatile memory and
for a second device coupled to the circuit board, permitting supply of power to the second device during reducing power to the device to the first level, wherein the second device comprises one or more of: a network interface device, an accelerator, or a graphics processing unit (GPU).

11. An apparatus comprising:
a circuit board coupled a device, firmware memory, and a power controller, wherein:
the firmware memory is to store a firmware update and
in response to a software-initiated command, the power controller is to reduce power to the device, that is to receive a firmware update, to a second level to turn off the device and to save Peripheral Component Interconnect (PCIe) configuration space information, and the power controller is to restore power to the device to a first level after the device is turned off to cause execution of the firmware update and to restore the PCIe configuration space information to the device, wherein the second level is lower than the first level.

12. The apparatus of claim 11, wherein the power controller is to reduce power solely to the device independent from supply of power to at least one other device.

13. The apparatus of claim 11, comprising at least one processor to save device configuration prior to reduction of power to the device.

14. The apparatus of claim 11, comprising at least one processor to execute a firmware update tool to provide a software-initiated command to the power controller.

15. The apparatus of claim 11, wherein the power controller is to reduce power to the device to cause a firmware update of the device and restore power to the device to cause execution of the firmware update.

16. The apparatus of claim 15, comprising at least one processor to load a saved device configuration into the device after restoration of power to the device.

17. The apparatus of claim 11, wherein the device comprises one or more of: a network interface, accelerator, central processing unit (CPU), graphics processing unit (GPU), accelerator, video card, memory controller, storage controller, or peripheral device.

18. The apparatus of claim 17, wherein the device is part of a system on chip (SoC).

19. The apparatus of claim 11, comprising one or more of: a server, data center, or rack and wherein the device is part of the server, data center, or rack.

20. The apparatus of claim 11, comprising a second device coupled to the circuit board, wherein
the firmware memory comprises non-volatile memory,
the power controller is to permit power application to the second device during the reduce power to the device, and
the second device comprises one or more of: a network interface device, an accelerator, or a graphics processing unit (GPU).

21. At least one non-transitory computer-readable medium comprising instructions stored thereon, that if executed by at least one processor, cause the at least one processor to:
configure a power controller to reset power to a device to a first level to turn off the device and to save Peripheral Component Interconnect (PCIe) configuration space information and then to a second level after the device is turned off to cause the device to execute updated firmware and to restore the PCIe configuration space information to the device without disruption of power to a second device that is not to receive a firmware update, wherein the first level is lower than the second level.

22. The at least one computer-readable medium of claim 21, wherein the instructions comprise part of a firmware update tool.

23. The at least one computer-readable medium of claim 21, wherein the device comprises a peripheral device coupled through an interface to a computing system.

24. The at least one computer-readable medium of claim 21, wherein the device and the second device are coupled to a circuit board and the second device comprises one or more of: a network interface device, an accelerator, or a graphics processing unit (GPU) and comprising the device loading the updated firmware from non-volatile memory.

\* \* \* \* \*